US012167519B2

(12) United States Patent
Hu et al.

(10) Patent No.: US 12,167,519 B2
(45) Date of Patent: Dec. 10, 2024

(54) SYSTEMS AND METHODS FOR A CURRENT SHARING DRIVER FOR LIGHT EMITTING DIODE

(71) Applicant: IDEAL INDUSTRIES LIGHTING LLC, Durham, NC (US)

(72) Inventors: Yuequan Hu, Morrisville, NC (US); Liqin Ni, Cary, NC (US)

(73) Assignee: IDEAL Industries Lighting LLC, Durham, NC (US)

( * ) Notice: Subject to any disclaimer, the term of this patent is extended or adjusted under 35 U.S.C. 154(b) by 0 days.

(21) Appl. No.: 16/925,682

(22) Filed: Jul. 10, 2020

(65) Prior Publication Data

US 2020/0344861 A1 Oct. 29, 2020

Related U.S. Application Data

(63) Continuation of application No. 14/083,070, filed on Nov. 18, 2013, now Pat. No. 10,743,384.

(51) Int. Cl.
*H05B 45/46* (2020.01)
*H05B 45/44* (2020.01)

(52) U.S. Cl.
CPC ............ *H05B 45/46* (2020.01); *H05B 45/44* (2020.01)

(58) Field of Classification Search
None
See application file for complete search history.

(56) References Cited

U.S. PATENT DOCUMENTS

2006/0255753 A1* 11/2006 Sawada .................. H05B 45/38 315/312
2008/0054815 A1* 3/2008 Kotikalapoodi ....... H05B 45/38 315/192
2008/0170012 A1* 7/2008 S .......................... G09G 3/3413 345/82

(Continued)

OTHER PUBLICATIONS

X. Qu, S. Wong and C. K. Tse, "A current balancing scheme with high luminous efficiency for high power LED lighting," IECON 2013—39th Annual Conference of the IEEE Industrial Electronics Society, 2013, pp. 169-174, doi: 10.1109/IECON.2013.6699130. (Year: 2013).*

(Continued)

*Primary Examiner* — Laura Yesildag
(74) *Attorney, Agent, or Firm* — Withrow & Terranova, P.L.L.C.

(57) ABSTRACT

Systems and methods for a current sharing driver for light emitting diodes are disclosed. One disclosed system includes: a first string of LEDs; a second string of LEDs connected in parallel with the first string; a first current control device connected in series with the first string of LEDs; a second current control device connected in series with the second string of LEDs; a first voltage measurement device coupled to the first string of LEDs and the second string of LEDs, the first voltage measurement circuit coupled to the first current control device and configured to control the first current control device; and a second voltage measurement device coupled to the first string of LEDs and the second string of LEDs, the second voltage measurement circuit coupled to the second current control device and configured to control the second current control device.

16 Claims, 10 Drawing Sheets

500

(56) References Cited

U.S. PATENT DOCUMENTS

| | | | | |
|---|---|---|---|---|
| 2010/0164404 | A1* | 7/2010 | Shao | H05B 45/14 315/297 |
| 2011/0080111 | A1* | 4/2011 | Nuhfer | H05B 45/44 315/291 |
| 2011/0157865 | A1 | 6/2011 | Takahashi et al. | |
| 2012/0153844 | A1* | 6/2012 | Chobot | H05B 45/48 315/297 |
| 2012/0268021 | A1 | 10/2012 | Lee et al. | |
| 2013/0002141 | A1* | 1/2013 | Lee | H05B 45/48 315/193 |
| 2013/0063035 | A1* | 3/2013 | Baddela | H05B 45/3577 315/192 |
| 2013/0083522 | A1 | 4/2013 | Bowers et al. | |
| 2013/0127344 | A1* | 5/2013 | Jin | H05B 45/395 315/122 |
| 2013/0249422 | A1* | 9/2013 | Kerstens | F21V 7/30 315/193 |
| 2013/0285564 | A1* | 10/2013 | van de Ven | H05B 45/48 315/186 |
| 2013/0301274 | A1 | 11/2013 | Anderson | |
| 2013/0322068 | A1 | 12/2013 | Clark et al. | |
| 2013/0322070 | A1 | 12/2013 | Clark et al. | |
| 2014/0015427 | A1* | 1/2014 | Sagen | H05B 45/48 315/186 |
| 2014/0049965 | A1 | 2/2014 | Aanegola et al. | |
| 2014/0062314 | A1* | 3/2014 | Moskowitz | H05B 47/28 315/185 R |
| 2014/0063792 | A1 | 3/2014 | Spencer et al. | |
| 2014/0126198 | A1 | 5/2014 | Dorney | |
| 2014/0210361 | A1* | 7/2014 | Ferrier | H05B 45/395 315/186 |
| 2014/0232270 | A1* | 8/2014 | Kimura | H05B 45/20 315/122 |
| 2014/0247590 | A1* | 9/2014 | Wilcox | H05B 45/46 362/230 |
| 2014/0268870 | A1 | 9/2014 | Boomgaarden et al. | |
| 2015/0228868 | A1 | 8/2015 | Ouderkirk | |
| 2015/0228869 | A1 | 8/2015 | Yoo et al. | |
| 2015/0276137 | A1 | 10/2015 | Demuynck et al. | |

OTHER PUBLICATIONS

T. Jiang, J. Zhang, K. Sheng and Z. Qian, "High-efficiency quasi-two-stage converter with current sharing for multi-channel LED driver," 2013 1st International Future Energy Electronics Conference (IFEEC), 2013, pp. 311-315, doi: 10.1109/IFEEC.2013.6687522 (Year: 2013).*

Tae-hoon Kim, Sang-hoon Lee, Joon-hyun Yang, Chang-soon Im, Dong-seok Hyun and Rae-young Kim, "A low cost multiple Current-Voltage concurrent control for smart lighting applications," IECON 2011—37th Annual Conference of the IEEE Industrial Electronics Society, 2011, pp. 2866-2871 (Year: 2011).*

Y. Hu and M. M. Jovanović, "A new current-balancing method for paralleled LED strings," 2011 Twenty-Sixth Annual IEEE Applied Power Electronics Conference and Exposition (APEC), 2011, pp. 705-712, doi: 10.1109/APEC.2011.5744673. (Year: 2011).*

X. Qu, S.-C. Wong and C. K. Tse, "A current balancing scheme with high luminous efficiency for high power LED lighting," IECON 2013—39th Annual Conference of the IEEE Industrial Electronics Society, Vienna, Austria, 2013, pp. 169-174, doi: 10.1109/IECON.2013.6699130. (Year: 2013).*

W. Chen and S. Y. R. Hui, "A dimmable light-emitting diode (LED) driver with cascaded mag-amp postregulators for multistring applications," IECON 2010—36th Annual Conference on IEEE Industrial Electronics Society, Glendale, AZ, USA, 2010, pp. 2523-2528, doi: 10.1109/IECON.2010.5675160. (Year: 2010).*

Tae-hoon Kim, Sang-hoon Lee, Joon-hyun Yang, Chang-soon Im, Dong-seok Hyun and Rae-young Kim, "A low cost multiple Current-Voltage concurrent control for smart lighting applications," IECON 2011—37th Annual Conference of the IEEE Industrial Electronics Society, Melbourne, VIC, Australia, 2011, pp. (Year: 2011).*

Y. Hu and M. M. Jovanović, "A new current-balancing method for paralleled LED strings," 2011 Twenty-Sixth Annual IEEE Applied Power Electronics Conference and Exposition (APEC), Fort Worth, TX, USA, 2011, pp. 705-712, doi: 10.1109/APEC.2011.5744673. (Year: 2011).*

United States Patent and Trademark Office, Office Action, U.S. Appl. No. 14/188,184 dated Jul. 10, 2015.

United States Patent and Trademark Office, Office Action, U.S. Appl. No. 14/188,184 dated Jun. 7, 2016.

United States Patent and Trademark Office, Office Action, U.S. Appl. No. 14/188,184 dated Feb. 1, 2016.

* cited by examiner

500

SYSTEMS AND METHODS FOR A CURRENT SHARING DRIVER FOR LIGHT EMITTING DIODE

RELATED APPLICATION

This application is a continuation of and claims the benefit of U.S. patent application Ser. No. 14/083,070, filed Nov. 18, 2013, now U.S. Pat. No. 10,743,384, the contents of which is incorporated herein by reference in its entirety.

FIELD OF THE INVENTION

The present invention generally relates to light emitting diode driver systems and more particularly to a current sharing driver for light emitting diodes.

BACKGROUND

As a result of continuous technological advances that have brought about remarkable performance improvements, light-emitting diodes (LEDs) are increasingly finding applications in traffic lights, automobiles, general-purpose lighting, and liquid-crystal-display (LCD) backlighting. LED lighting is poised to replace existing lighting sources such as incandescent and fluorescent lamps since LEDs do not contain mercury, exhibit fast turn-on and dimmability, long life-time, and require low maintenance. Compared to fluorescent lamps, LEDs can be more easily dimmed either by linear dimming or PWM (pulse-width modulated) dimming.

A light-emitting diode (LED) is a semiconductor device that emits light when its p-n junction is forward biased. While the color of the emitted light depends primarily on the composition of the material used, its brightness is directly related to the current flowing through the junction. As a result, an effective way to ensure that LEDs produce similar light output is to connect them in series so that all LEDs in a string have the same current. Unfortunately, a major drawback of the series connection of LEDs is that the cumulative voltage drop of each LED limits the number of LEDs in a string. LEDs may be placed in parallel to reduce the total voltage drop. However, often circuits placed in parallel have different currents. Thus, LEDs in parallel may output light at differing brightness. Accordingly, there is a need for a circuit to manage current flow to maintain a level of brightness between two or more LED strings placed in parallel.

SUMMARY

Embodiments of the present disclosure include circuits for balancing the current between two or more strings of LEDs in parallel. Embodiments may include a plurality of LED strings placed in parallel to form a light output, e.g., as a replacement for a traditional incandescent or fluorescent light source. In some embodiments, the voltage of each of the plurality of strings may be measured and compared, and based on the comparison, the current provided to each of the plurality of strings may be increased or decreased. In some embodiments, this may substantially balance the current between the strings. Alternatively, in some embodiments, the ratio between the current flowing through each of the plurality of strings may be set to a predetermined level to properly blend the brightness of each string.

In one embodiment, a system of the present disclosure may comprise: a first string of LEDs; a second string of LEDs connected in parallel with the first string of LEDs; a first current control device connected in series with the first string of LEDs; a second current control device connected in series with the second string of LEDs; a first voltage measurement device coupled to the first string of LEDs and the second string of LEDs, the first voltage measurement device coupled to the first current control device and configured to control the first current control device; and a second voltage measurement device coupled to the first string of LEDs and the second string of LEDs, the second voltage measurement device coupled to the second current control device and configured to control the second current control device.

In another embodiment, a system of the present disclosure may comprise: a first string of LEDs; a second string of LEDs connected in parallel with the first string of LEDs; and a switching regulator configured to control the current flowing through the first string of LEDs.

In another embodiment, a method for manufacturing a current sharing driver may comprise the steps of: providing a first string of LEDs; providing a second string of LEDs connected in parallel with the first string; providing a first current control device connected in series with the first string of LEDs; providing a second current control device connected in series with the second string of LEDs; providing a first voltage measurement device coupled to the first string of LEDs and the second string of LEDs, the first voltage measurement device coupled to the first current control device and configured to control the first current control device; and providing a second voltage measurement device coupled to the first string of LEDs and the second string of LEDs, the second voltage measurement device coupled to the second current control device and configured to control the second current control device.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
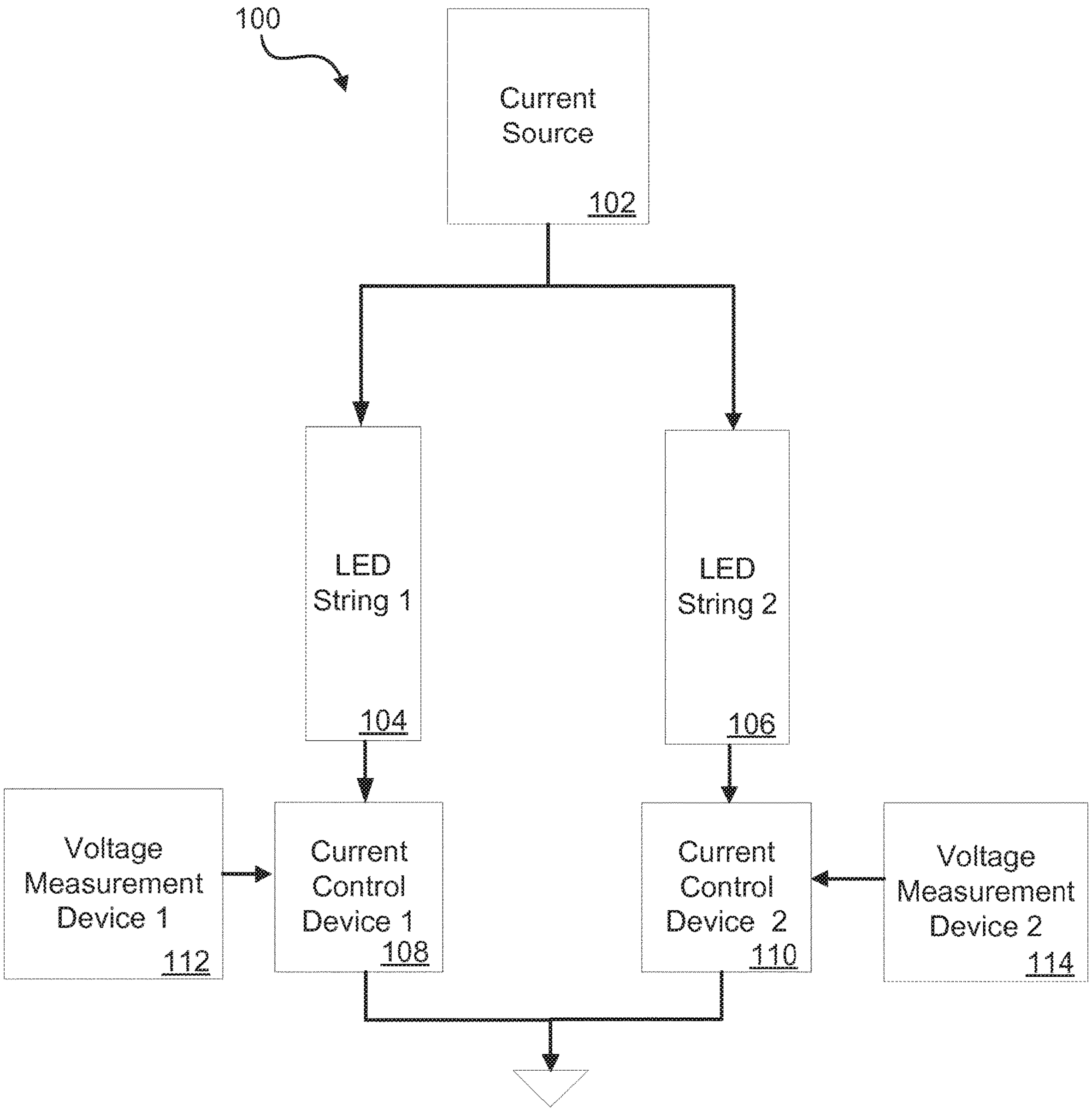
FIG. 1 shows a system for a current sharing driver for light emitting diodes according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Current Sharing Driver for Light Emitting Diodes

One embodiment of the present disclosure comprises a plurality of LED strings used to form a light source, e.g., a replacement for a traditional incandescent bulb, fluorescent tube, compact fluorescent, or halogen bulb. Each LED string comprises one or more LEDs, and may comprise a plurality of LEDs in series. In some embodiments, the LEDs may all be of the same color, e.g., white, blue, red, etc. Alternatively, in some embodiments, one or more of the LEDs in a string may comprise a different color. Further, in some embodiments, each string of LEDs may be made up of different color LEDs.

As is well known in the art, the current flowing through two circuits in series will be equal, whereas the voltage drop across each circuit is the input voltage multiplied by the ratio of the impedance of each circuit to the total impedance of the circuit. As discussed above, the brightness of an LED is based on the current passing through that LED. Thus, each LED in a string will have substantially the same brightness. However, when a plurality of LEDs is placed in series, the total voltage drop across the LEDs limits the total number of LEDs that can be placed in a string.

In one embodiment, in order to increase the total number of LEDs in the light source, each of the plurality of strings of LEDs is placed in parallel. As is known in the art, the current flowing through two circuits in parallel is the input current multiplied by the ratio of the impedance of each circuit to the total impedance of the circuit. Thus, in the illustrative embodiment, the current flowing through each of the strings of LEDs may be different. Thus, each string may have a different brightness. The present disclosure describes in detail multiple example circuits that solve this problem by controlling the current flowing through each string of LEDs. Controlling the current between each string of LEDs may guarantee a uniform brightness between each string. Further, controlling the current may enable higher quality light by controlling the current flowing through various color strings, for example, to set a level of warmth of the overall light output.

One system for solving this problem comprises placing two transistors, such as NPN type transistors, with a common base in series with the two strings of LEDs and two current sensing resistors (one resistor associated with each string of LEDs). In such an embodiment, the common base may be connected to the collector of one of the transistors. In such an embodiment, if the two transistors are ideally matching, the voltages across the two current sensing resistors will be equal. Thus, the current shared by the two LED strings will be the ratio of the two sensing resistors. Thus, in an embodiment with two LED strings LED1 and LED2 and two resistors R1 and R2, the current across each LED string will be:

$$ILED1=I*R2/(R1+R2)$$

$$ILED2=I*R1/(R1+R2)$$

Where:

ILED1=the current through the first string of LEDs, LED1;

ILED2=the current through the second string of LEDs, LED2; and

I=the total current shared by the two LED strings.

One drawback for a current sharing circuit according to this embodiment is that the voltage of the first string of LEDs (VLED1) needs to be no less than the string voltage of the second string of LEDS (VLED2). If this is not the case, then one of the transistors may enter saturation. When in saturation, the transistors may not control the current flowing through each string to the level set by the resistors, i.e., the current flowing through each string of LEDs may be different than the levels determined using the formulas above.

Another embodiment may include a third string of LEDs with a transistor connected in series with the third string and a common base with the other two transistors. Such an embodiment may further include a third sensing resistor in series with the third string of LEDs. In such an embodiment, the string voltage of the first string of LEDs (the string for which the transistor's base is connected to the collector) needs to be the highest among all the LED string voltages to ensure all the LED currents match the values set by the current sensing resistors.

In the embodiments described above, the constraint of maintaining the voltage drop across the first string of LEDs higher than the voltage drop across the other strings complicates the selection of LEDs. For example, the forward voltage drops of LED strings may vary with temperature and driving current. Thus, in one embodiment, desired operation may be ensured by selecting LEDs such that the minimum voltage of the first string of LEDs is no less than the maximum voltage of the other strings of LEDs. However, in some embodiments, this may increase power loss for the circuit. For example, in one embodiment, in a lighting fixture, if the voltage difference between the voltage of LED1 and the voltage of the other strings is 10V and the driving current is 0.35 A, the power loss will be 3.5 W. This may decrease the overall efficiency of the lighting fixture and also increase the thermal stress to the transistor and LEDs, thus shortening the operational life of the device.

Another embodiment may comprise using linear regulators to regulate the current to all but one of the strings of LEDs. However, such an embodiment may again suffer from the same deficiencies as the circuit described above.

Yet another embodiment for solving the problem discussed above may comprise current balancing transformers to equalize currents flowing through each of the LED strings. In one such embodiment, a magnetic balancer may be used to balance the current flowing through three strings of LEDs. In such an embodiment, two transformers with an equal number of turns of their primary and secondary windings may be connected between the output rectifier and the filter capacitor in three isolated outputs of a switch-mode power supply. Further, in such an embodiment, the current feedback from one output is used to set and regulate the current of the corresponding LED string. The 1:1 turn ratio of the transformer windings maintains the current flowing through each winding of the transformer at substantially the same value provided that the magnetizing current of the transformer is small compared to the winding current.

A deficiency of this embodiment is that it requires a switch-mode power supply. Thus, such an embodiment cannot be used independently, and lacks the flexibility to operate with an arbitrary DC source, for example, a DC current source. Furthermore, the addition of transformers for magnetic balancing into a switch-mode power supply increases the complexity and cost of the circuit. Furthermore, in some embodiments, separate output circuits may be detrimental if a large number of paralleled LED strings are required. Furthermore, such an embodiment lacks the capability to individually change or tune the current flowing through each LED string once the turns-ratio of the transformer has been set. Thus, such an embodiment may not be effective for color mixing or control.

Another system for compensating for this problem without the above discussed deficiencies comprises a current control device such as a JFET or MOSFET in series with each string of LEDs. In this, embodiment, referred to as the "illustrative embodiment," each current control device is controlled by a control device, such as a comparator and/or op-amp circuit. Each control device measures the voltage drop before and/or after the current control device, and based on this measurement, varies the impedance of the current control device, e.g., by varying a voltage to the base of the JFET, to increase or decrease the current flowing through each LED string. In the illustrative embodiment, the current measurement and control devices may be able to substantially balance the current flowing through each LED string in order to cause each LED string to have substantially the same light output.

The illustrative embodiment may comprise sensing resistors placed in series with each LED string after the control circuit. Choosing resistors with different values may vary the voltage drop measured by each measurement device. Appropriate selection of the value of these sensing resistors enables the designer to vary the brightness of each string of LEDs to provide the desired light output. For example, the designer may include multiple strings of white LEDs kept at a substantially high brightness, but further include one string of red LEDs to provide a warmer light output. In such an embodiment, the designer may select sensing resistors configured to cause the string of red LEDs to receive a lower current, and therefore be dimmer than the string of white LEDs. In such an embodiment, the brightness of the red LEDs may be set to provide the desired warmth of the total light output.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

Illustrative Systems for a Current Sharing Driver for Light Emitting Diodes

Turning now to the Figures, FIG. 1 shows an embodiment of a current sharing driver for light emitting diodes 100. As shown in FIG. 1, the system 100 comprises a current source 102, two LED strings 104 and 106, two current control devices 108 and 110, and two voltage measurement devices 112 and 114. One skilled in the art will recognize that in some embodiments the system 100 may include additional components, including electrical components such as: resistors, capacitors, diodes, transistors, amplifiers, or other electronic components known in the art.

As shown in FIG. 1, the current source 102 comprises a source of DC current. In some embodiments, this may comprise a rectifier configured to convert AC current to DC current, e.g., a full wave or single wave rectifier along with a capacitor. Alternatively, in some embodiments the current source 102 may comprise a battery, such as a dry or wet cell battery, e.g., a battery found in a traditional or hybrid automobile.

The LED strings 104 and 106 comprise one or more LEDs, for example a plurality of LEDs in series. Each of LED strings 104 and 106 may comprise a plurality of inorganic LEDs, which may include semiconductor layers forming p-n junctions and/or organic LEDs (OLEDs), which may include organic light emission layers. In some embodiments, light perceived as white or near-white may be generated by a combination of red, green, and blue ("RGB") LEDs. Output color of such a device may be altered by separately adjusting supply of current to the red, green, and blue LEDs.

The current control devices 108 and 110 comprise devices configured to control the current flow through each LED string 104 and 106. In some embodiments, current control devices 108 and 110 may comprise transistors such as a Bipolar Junction Transistor (BJT). In such an embodiment, the BJT may be configured to act as a switch to control current flow, e.g., by connecting the BJT in series with an LED string, such that current must flow from the collector to the emitter of the BJT. In such an embodiment, varying the current applied to the base of the BJT may vary the current allowed to flow through the BJT and thus the amount of current that is allowed to flow through the string of LEDs. In another embodiment, the current control devices 108 and 110 may comprise MOSFETs. In such an embodiment, the MOSFET may be configured to act as a switch to control current flow, e.g., by connecting the MOSFET in series with an LED string such that current must flow from the MOSFET's drain to its source. In such an embodiment, varying the voltage applied to the gate of the MOSFET may vary the current allowed to flow through the MOSFET and thus the amount of current that is allowed to flow through the string of LEDs. In some embodiments, because a MOSFET can be driven using voltage, a MOSFET will require lower power and thus use less energy and reduce the total heat dissipated by the circuit. In other embodiments, current control devices 108 and 110 may comprise other transistors, e.g., junction gate field-effect transistors (JFET) or insulated gate field effect transistors (IGFET).

The voltage measurement devices 112 and 114 comprise devices configured to measure the voltage drop at a point along each LED string. For example, in some embodiments a sensing resistor of a known value may be located either before or after each string of LEDs. By measuring the voltage drop across this resistor, the voltage measurement devices 112 and 114 may be able to determine the current flowing through each string of LEDs, e.g., because V=I*R. Further, in some embodiments, each current control device is configured to measure the voltage at each string of LEDs. In some embodiments, each voltage measurement device is configured to compare the voltage of each string of LEDs and, based on the comparison, output a current/voltage to current control devices 108 and 110. As described above, this current/voltage will cause current control devices 108 and 110 to vary the current allowed to pass through each LED string.

In some embodiments, each of voltage measurement devices 112 and 114 may comprise a circuit comprising both a comparator and an op-amp. As is known in the art, a comparator is a device that compares two voltages or currents and outputs a digital signal indicating which is larger. Ordinarily, a comparator will have two analog input terminals V+and V-, and one binary digital output. The output of a comparator in ordinary operation is:

$$\text{Output=high, if } V+>V-$$

$$\text{Output=low, } V+<V-$$

Similarly, an op-amp can be configured to amplify the difference between two signals. In some embodiments, each of the comparator and the op-amp is configured to receive the voltage from each of the two LED strings. Further, each is configured to compare these voltages and output a signal indicating which voltage is higher.

In one embodiment, the comparator configured to control LED string 104 may receive the voltage associated with LED string 104 at its negative terminal and the voltage associated with LED string 106 at its positive terminal. In such an embodiment, if the voltage of LED string 104 is higher than the voltage of LED string 106, the comparator will set its output to high. Such a setting will cause the current control device 108 to increase current flow. Alternatively, if the voltage of LED string 104 is lower than the voltage of LED string 106, the comparator will set its output to low. Such a setting will cause the current control device 108 to reduce current flow.

In some embodiments, voltage measurement devices 112 and 114 may comprise op-amps configured to measure the voltage after each of current control devices 108 and 110. For example, in some embodiments, sensing resistors of a known value may be located after the output of current control devices 108 and 110. By measuring the voltage drop across these resistors, the op-amps may be able to make further determinations regarding the current flowing through each string of LEDs. For example, in the embodiment described above, wherein the voltage across LED string 104 is higher than the voltage across LED string 106, an op-amp associated with voltage measurement device 112 amplifies the difference, i.e., output=voltage of LED string 104-voltage of LED string 106. If the voltage of LED string 106 becomes lower, the op-amp will increase its output and thus provide a higher driving voltage/current to current control device 108, which increases the current flowing through LED string 104.

In some embodiments, voltage measurement devices 112 and 114 may comprise both op-amps and comparators. In other embodiments, voltage measurement devices 112 and 114 may each comprise only op-amps. An op-amp may be advantageous because generally they are of lower cost than a comparator. However, comparators may be advantageous due to a faster slew rate that can reduce noticeable oscillations in the current found on each string of LEDs.

Embodiments of the present disclosure may allow for current matching, i.e., causing both of LED strings 104 and 106 to have substantially the same current. Other embodiments are configured to allow for current tuning, i.e., causing LED strings 104 and 106 to each have a predetermined current or a predetermined relationship between currents, e.g., in one embodiment, LED string 104 will have 40% of the total current regardless of the total current. These design choices allow a designer to set the level of brightness between each string of LEDs, or the ratio of brightness between each string of LEDs.

Further, in some embodiments, different color strings of LEDs may be used. A designer may use embodiments of the present disclosure to tune the brightness of each string to provide the desired light output and color mixing. For example, the designer may include multiple strings of white LEDs kept at a substantially high brightness, but further include one string of red LEDs to provide a warmer light output. In such an embodiment, the designer may select sensing resistors configured to cause the string of red LEDs to receive a lower current, and therefore be dimmer than the strings of white LEDs. In such an embodiment, the brightness of the red LEDs may be set to provide the desired warmth of the total light output. Further, in some embodiments one or more the LED strings may comprise different color LEDs, or LEDs with different light output characteristics, e.g., dominant wavelength ("DW"), peak wavelength ("PW"), uniform light output, total luminous flux ("TLF"), and light color rendering index ("CRT"). Embodiments of the present disclosure may be used to control current flow through each string of LEDs to compensate for these factors.

In some embodiments, additional LED strings may be included. For example, in one embodiment, a third string of LEDs, a third current control device, and a third voltage measurement device may be included. In such an embodiment, the sensing resistors may be selected to provide for current matching between each of the three strings or for a predetermined ratio between the current of each of the three strings. In still other embodiments, additional LED strings, current control devices, and voltage measurement devices may be included. In still other embodiments, a plurality of circuits of the type described with regard to FIG. 1 may be included in modules to allow for an even greater number of LED strings to be included in the light source. In some embodiments, each of these modules may be placed in series to ensure there is uniform current through each module.

In some embodiments, each of the components described with regard to FIG. 1 may be included in a specialized form factor LED lamp. In one such embodiment, an LED lamp may be made with a form factor that allows it to replace a standard incandescent bulb, or any of various types of fluorescent lamps. LED lamps often include some type of optical element or elements to allow for localized mixing of colors, collimate light, or provide a particular light pattern. Sometimes the optical element also serves as an envelope or enclosure for the electronics and/or the LEDs in a lamp. LED lamps and LED light fixtures can use either transmissive optical elements or reflective optical elements. For example, a so-called "troffer" style ceiling fixture includes a reflector that serves and an optical element, and in some embodiments may include additional optical elements such as glass plates or lenses.

FIGS. 2-10 comprise example embodiments of systems for a current sharing driver for light emitting diodes. The embodiments shown in FIGS. 2-10 each comprise a plurality of strings of LEDs as well as voltage measurement devices and current control devices. A person of ordinary skill in the art will recognize that each of the circuits shown in FIGS. 2-10 may be used in combination with another circuit. For example, the current control system shown in FIG. 2 may be used in combination with components described with regard to FIGS. 3-10. Further a person of ordinary skill will recognize that the number of LEDs on each LED string is a design choice and may be varied such that more or fewer LEDs may be included on each string.

Figure 2:
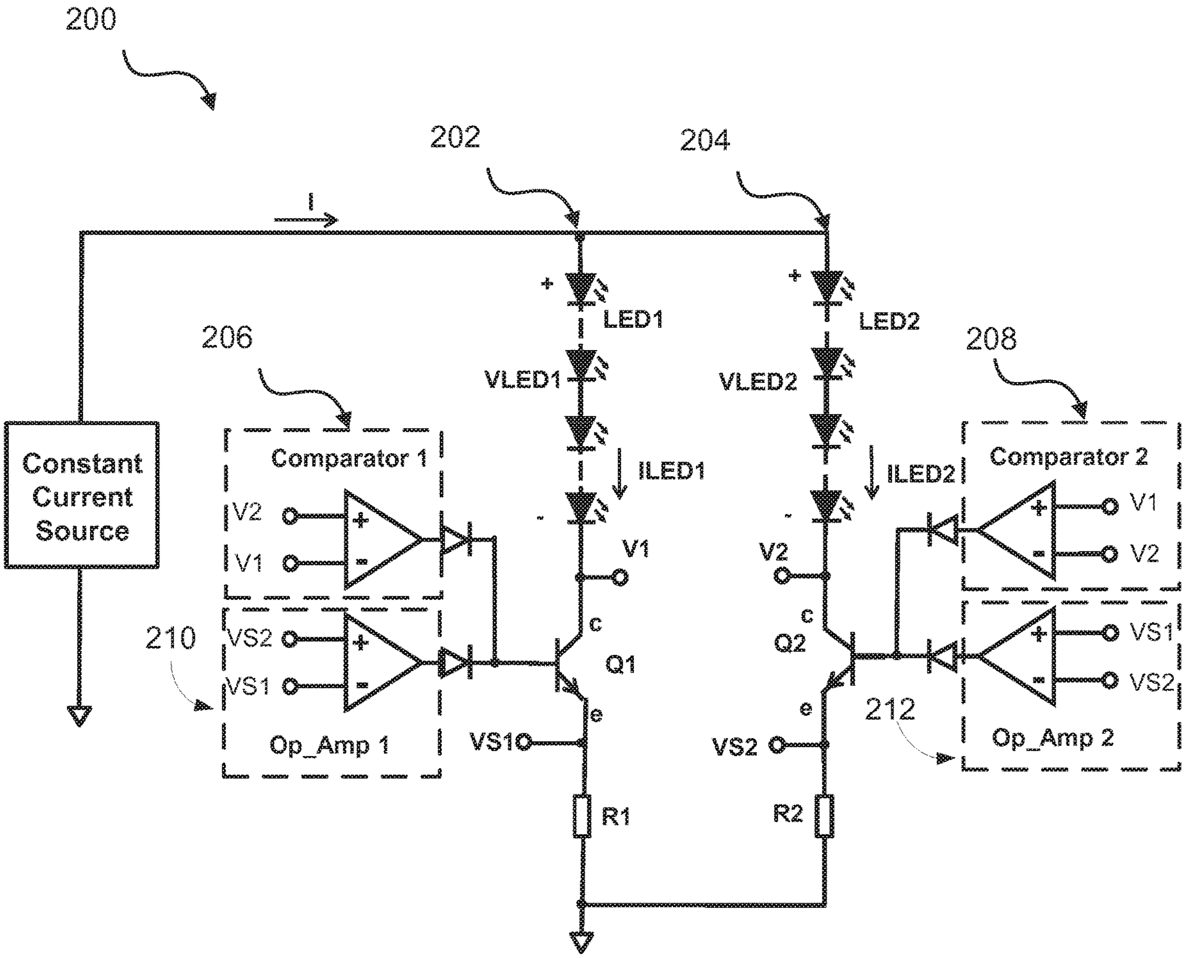
FIG. 2 shows an example system for a current sharing driver for light emitting diodes according to one embodiment.

Turning now to FIG. 2, FIG. 2 shows an example system 200 for a current sharing driver for light emitting diodes according to one embodiment. As shown in FIG. 2, system 200 comprises a current sharing circuit for two LED strings 202 and 204. Each LED string comprises one or more LEDs, for example a string may comprise a plurality of LEDs in series. Circuit 200 comprises comparator 1 (represented by reference number 206) and comparator 2 (represented by reference number 208), op-amp 1 (represented by reference number 210) and op-amp 2 (represented by reference number 212), bipolar transistors Q1 and Q2, and current sensing resistors R1 and R2.

As shown in FIG. 2, comparator 1 (represented by reference number 206) and comparator 2 (represented by reference number 208) compare the voltage V1 and V2 at the collector of one bipolar transistor with the voltage V2 and V1 of the collector of another bipolar transistor. This comparison enables the comparator to determine if one LED string has higher voltage than the other LED string. For example, in one embodiment, comparator 1 compares voltage V1 at the collector of Q1 with voltage V2 at the collector of Q2. If the voltage of the first string of LEDs, VLED1 is higher than voltage of the second string of LEDs, VLED2, V1 will be lower than V2, and comparator 1 will thus set its output to high. Such a setting will set bipolar transistor Q1 to be fully saturated, e.g., fully turned on and therefore increasing current flow. Further, in such an embodiment, the output of comparator 2 is set to LOW since V2 is higher than V1. Such a setting will set bipolar transistor Q2 to off and thus reduce current flow.

As shown in FIG. 2, the op-amp 1 and op-amp 2 are both connected to the emitters of bipolar transistors Q1 and Q2. This enables op-amp 1 and op-amp 2 to measure the difference between the voltage at the emitters of each of Q1 and Q2, shown in FIG. 2 as VS1 and VS2. Based on this measurement, op-amp 1 and op-amp 2 drive the two bipolar transistors Q1 and Q2. In the example above, wherein V2 is higher than V1, op-amp 2 takes the sensed current signal VS1 as a current reference for LED string LED2, and amplifies the error (ΔV=VS1−VS2). If VS2 becomes lower, the output of op-amp 2 becomes higher to provide higher driving current (Ibe2) to the bipolar transistor Q2, and the current flowing through the collector of Q2, i.e., the current of the second string of LEDs (ILED2), will thus increase because ILED2=β*Ibe2, where Ibe2 is the current flowing from the base of Q2 to the emitter of Q2 and β is the current amplification coefficient of Q2. As discussed above, because the brightness of an LED is associated with current flow, in this example, transistor Q2 will increase the brightness of the second string of LEDs.

In another embodiment, if VS2 becomes higher, the output of op-amp 2 becomes lower, providing a lower driving current (Ibe2) to the bipolar transistor Q2 and the current flowing through the collector of Q2, i.e., the current of the second string of LEDs (ILED2) will decrease.

In the embodiment shown in FIG. 2, VS1=ILED*R1; VS2=ILED2*R2, and ILED*R1=ILED2*R2. Therefore, ILED2=ILED1(R1/R2). Thus, if R1 is selected to be the same as R2, then ILED1=ILED2, which means the total current from the constant current source is evenly shared by the two LED strings. In such an embodiment, the two strings will have substantially the same brightness.

In another embodiment, V1 may be higher than V2 if VLED1 is lower than VLED2. In this case, the output of comparator 2 is set to high whereas the output of comparator 1 is set to low, and bipolar transistor Q2 is saturated or fully turned on, while the current through the collector and emitter of bipolar transistor Q1 is controlled by the output of op-amp 1. In such an embodiment, op-amp 1 takes the sensed current signal VS2 as the current reference for string LED1. In the same manner described above, the current ILED1 flowing through LED1 is regulated, and ILED1=ILED2*(R2/R1). Therefore, ILED2=ILED2 if R1=R2.

Thus, in the example described above, the comparator and op-amp circuits automatically differentiate which LED string has a higher voltage, and provide an exact current to the LED strings as set by the ratio of the two current sensing resistors R1 and R2.

A person of ordinary skill in the art will recognize that the circuit shown in FIG. 2 may be used in combination with another circuit. For example, the current control system shown in FIG. 2 may be used in combination with components described with regard to FIGS. 3-10.

Figure 3:
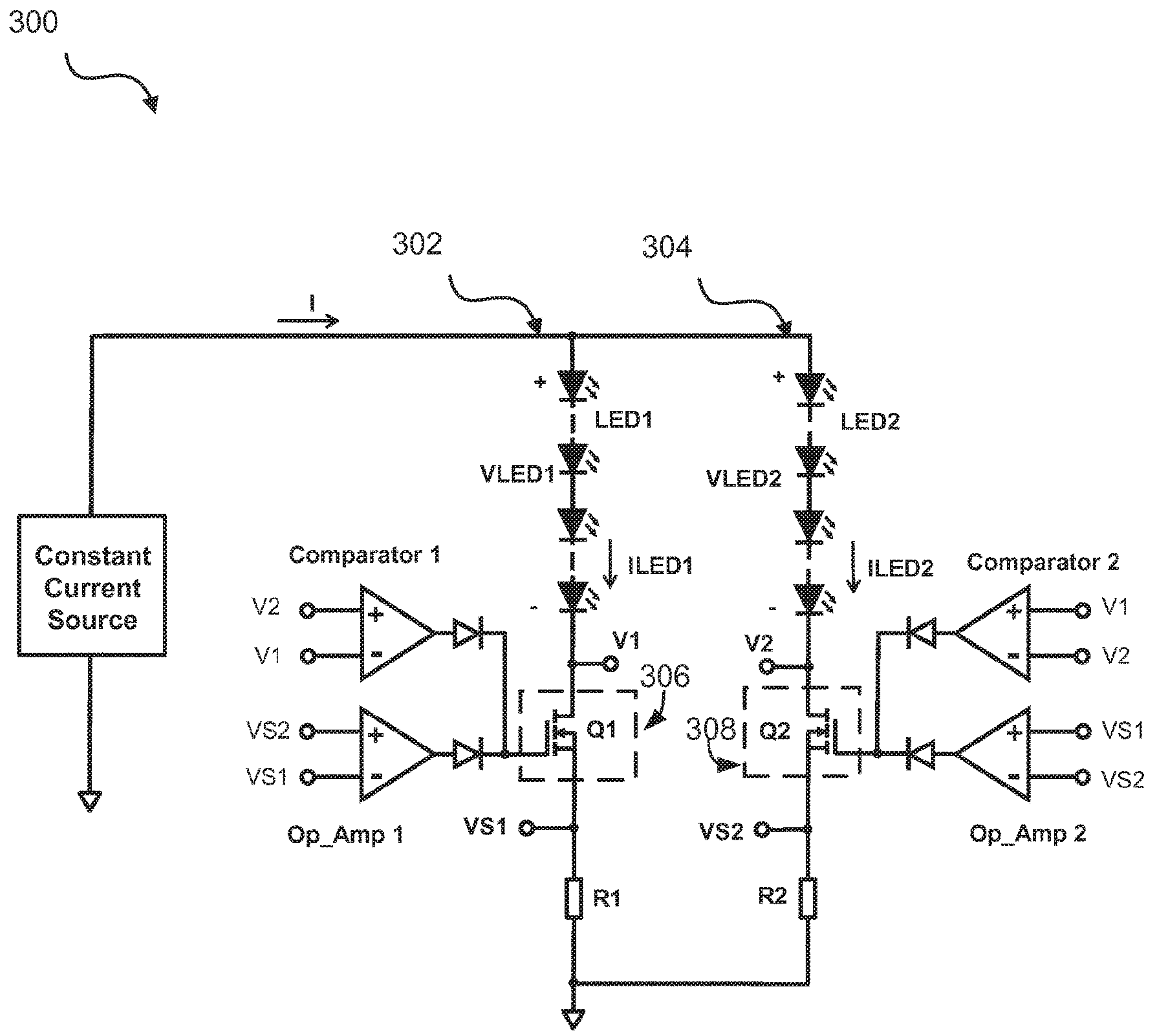
FIG. 3 shows another example system for a current sharing driver for light emitting diodes according to one embodiment.

Turning now to FIG. 3, FIG. 3 shows an example system 300 for a current sharing driver for light emitting diodes according to one embodiment. The system 300 is similar to system 200 described with regard to FIG. 2. However, as shown in FIG. 3, system 300 implements MOSFETs (metal-oxide-semiconductor field-effect transistor) to regulate current in two strings of LEDs 302 and 304. In some embodiments, MOSFETs may be advantageous over bipolar transistors because a MOSFET may be driven with a voltage source instead of current. In some embodiments, this may reduce the power required to drive the op-amp and comparator circuits, thus leading to a more energy efficient system that may operate at a lower temperature.

In system 300, shown in FIG. 3, the current flowing through the drain to source of the MOSFET depends on the amplitude of the driving voltage across the gate to source of the MOSFET. In the linear range, a higher driving voltage results in a higher current, and vice versa. Thus as with system 200 described with regard to FIG. 2, the comparator and op-amp circuits control the MOSFETS to increase or decrease the current flowing through each string of LEDs.

A person of ordinary skill in the art will recognize that the circuit shown in FIG. 3 may be used in combination with another circuit. For example, the current control system shown in FIG. 3 may be used in combination with components described with regard to FIGS. 2 and 4-10.

Figure 4:
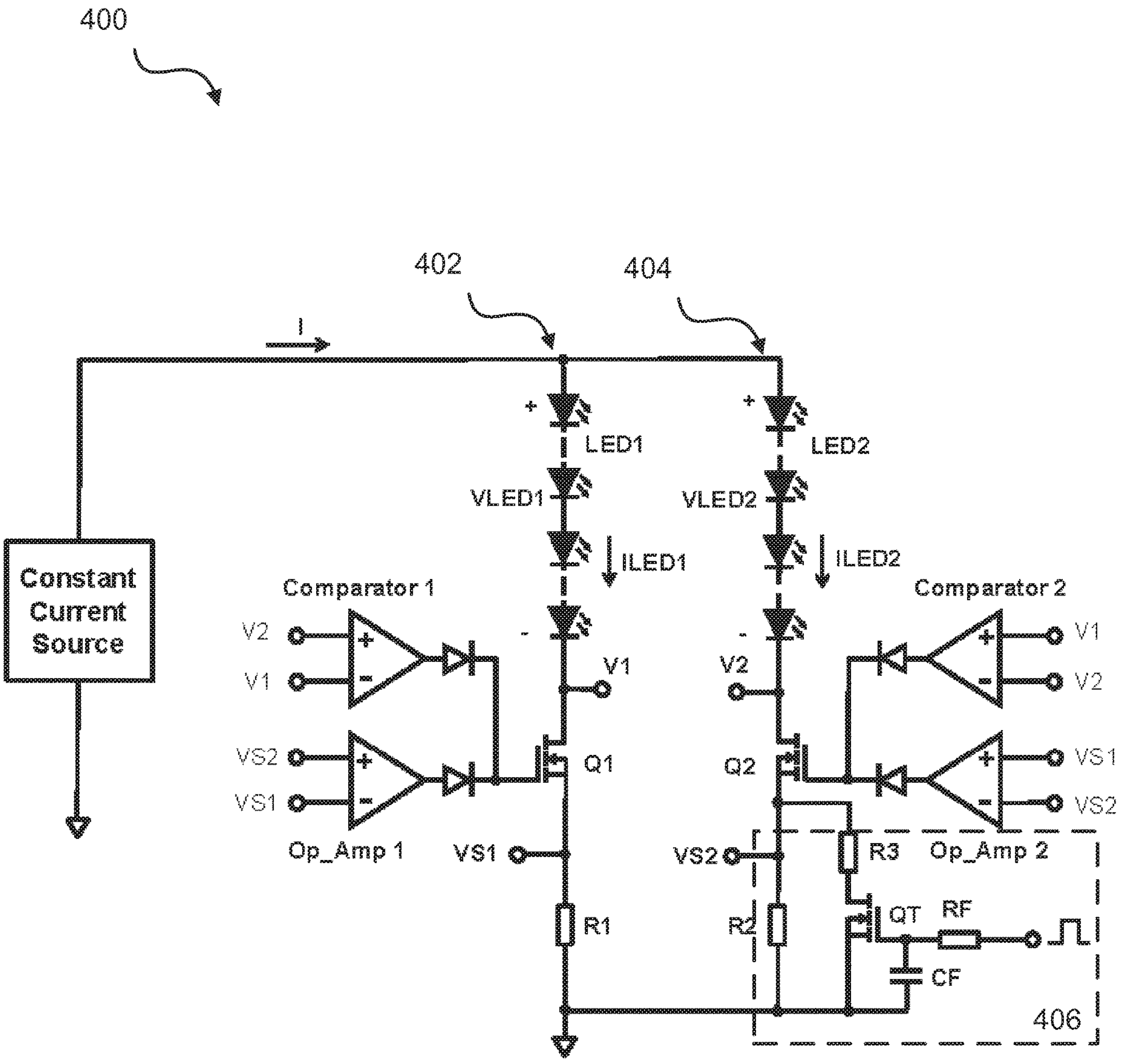
FIG. 4 shows another example system for a current sharing driver for light emitting diodes according to one embodiment.

Turning now to FIG. 4, FIG. 4 shows yet another example system 400 for a current sharing driver for light emitting diodes according to one embodiment. The circuit shown in FIG. 4 comprises a circuit that operates similarly to the circuits described with regard to FIGS. 2 and 3. However, the system 400 further comprises a tuning circuit comprising a pulse generator, shown in this embodiment as a PWM pulse, an RC filter comprising resistor RF and capacitor CF, a MOSFET operating as a switch QT, and a resistor R3. Each of these components is shown within the dashed box identified by reference no. 406.

The PWM pulse can be a control signal from an external control unit or an on-board micro-controller. With this tuning circuit, the impedance of the control switch QT can be varied. For example, in the embodiment shown in FIG. 4, the PWM circuit varies whether current is allowed to flow through QT. This controls whether resistor R3 is in parallel with resistor R2. When QT is fully turned on, resistor R3 is in parallel with R2 thus reducing the total current-sensing resistance. When QT is open, resistor R3 is not in parallel with R2, thus increasing the total resistance. The impedance of QT depends on the voltage level at its gate terminal which is set by the duty cycle and amplitude of the PWM pulse. In this way, the current and the light intensity of string LED2 (identified by reference no. 404) can be adjusted. In some embodiments, this may be used for color mixing. For example, if string LED1 (identified by reference no. 402) is a BSY (blue-shifted-yellow) string and string LED 2 is a RED color string, the current of each string may be set such that the color temperature of the total light output is tuned to the desired value.

A person of ordinary skill in the art will recognize that the circuit shown in FIG. 4 may be used in combination with another circuit. For example, the current control system shown in FIG. 4 may be used in combination with components described with regard to FIGS. 2-3 and 5-10.

Figure 5:
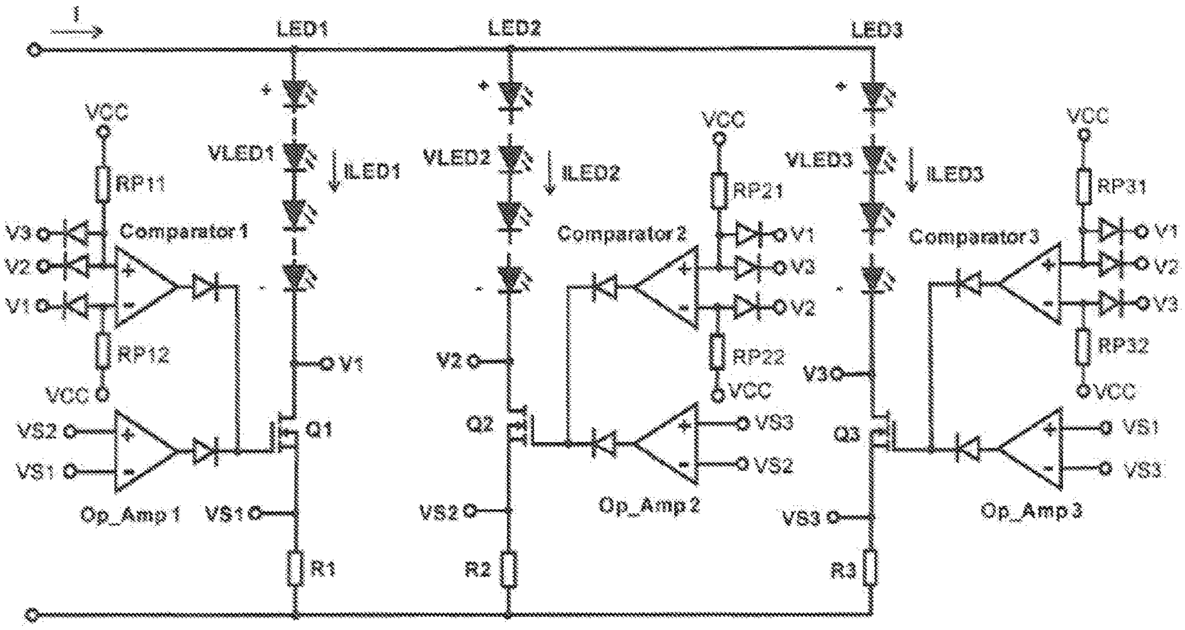
FIG. 5 shows another example system for a current sharing driver for light emitting diodes according to one embodiment.

Turning now to FIG. 5, FIG. 5 shows yet another example system 500 for a current sharing driver for light emitting diodes according to one embodiment. As shown in FIG. 5, the system 500 is similar to system 300 described with regard to FIG. 3. However, the circuit shown in FIG. 5 includes a third string of LEDs, LED3. As shown in FIG. 3, each of the three LED strings is coupled to a MOSFET (Q1, Q2, and Q3), a current sensing resistor (R1, R2, and R3), a comparator (comparator 1, comparator 2, and comparator 3), and an op-amp (op_amp 1, op_amp 2, and op_amp 3).

In circuit 500, each component other than the three comparators operates in substantially the same way as described above with regard to FIGS. 2-4. As shown in FIG. 5, each comparator is configured to measure the voltage across each string. Specifically, comparator 1, configured to control MOSFET Q1 and thus vary the current flowing through LED1, compares the voltage of LED1 to the voltage of LED2 and LED3. As shown in FIG. 5, the voltage from string LED1 (V1) along with a pull-up (VCC) and resistor RP12 is connected to the negative terminal of comparator 1 via a diode. The positive terminal of comparator 1 is connected to two diodes connected to V2 and V3 respectively and a pull-up (VCC) and resistor RP11. In this embodiment, if V1 is lower than the lower of V2 and V3, the output of comparator 1 is set to high, and Q1 is fully turned on. However, if V1 is higher than the lower value of V2 and V3, the output of comparator 1 is set to low, thus causing Q1 to restrict current flow. Further, in the embodiment shown in FIG. 5, op-amp 1 amplifies the error between voltage at VS1 and VS2, and maintains VS1=VS2 by adjusting the drive voltage at the gate terminal of MOSFET Q1.

As shown in FIG. 5, the other two strings, LED2 and LED3 operate similarly, e.g., comparator 2, configured to control MOSFET Q2 coupled in series with LED string 2, is connected to V2 and a pull-up and resistor RP22 at its negative terminal and V1 and V3 plus a pull-up and resistor RP21 at its positive terminal. Similarly, comparator 3 configured to control MOSFET Q3 coupled in series with LED string 3 is connected to V3 and a pull-up and resistor RP32 at its negative terminal and V1 and V2 plus a pull-up and resistor RP31 at its positive terminal. The other two op-amps, op_amp 2 and op_amp 3 have a similar operation as described above and maintain VS2=VS3, and VS3=VS1. Therefore, VS1=VS2=VS3, i.e., ILED1*R1=ILED2*R2=ILED3*R3. The current flowing through each LED string is determined by the equation below.

$$ILED1=((R2*R3)/\Delta)*I$$

$$ILED2=((R1*R3)/\Delta)*I$$

$$ILED3=((R1*R2)/\Delta)*I$$

Where:

I=the total input current; and $$\Delta=R1*R2+R2*R3+R1*R3.$$

One of ordinary skill in the art will recognize that if R1=R2=R3, then ILED1=ILED2=ILED3. Thus, by setting each resistor to an equal value, each LED string may have substantially the same brightness. Alternatively, the resistor values may be varied in order to vary the brightness of each string. In some embodiments, this may be employed for color or lighting compensation. For example, in some embodiments, one or more of the LED strings may comprise different color LEDs, or LEDs with different light output characteristics, e.g., dominant wavelength ("DW"), peak wavelength ("PW"), uniform light output, total luminous flux ("TLF"), and light color rendering index ("CRT"). In some embodiments a designer may select values of resistors R1, R2, and R3 in order to compensate for these differences or provide a higher overall light quality. For example, in one embodiment, one of the LED strings may comprise LEDs of a different color than the other two strings. In such an embodiment, resistors R1, R2, and R3 may be selected such that this different color string has a different current level and thus a different brightness than the other two strings. This may be used to, for example, change the warmth of the light output or control the color of the light.

A person of ordinary skill in the art will recognize that the circuit shown in FIG. 5 may be used in combination with another circuit. For example, the current control system shown in FIG. 5 may be used in combination with components described with regard to FIGS. 2-4 and 6-10.

Figure 6:
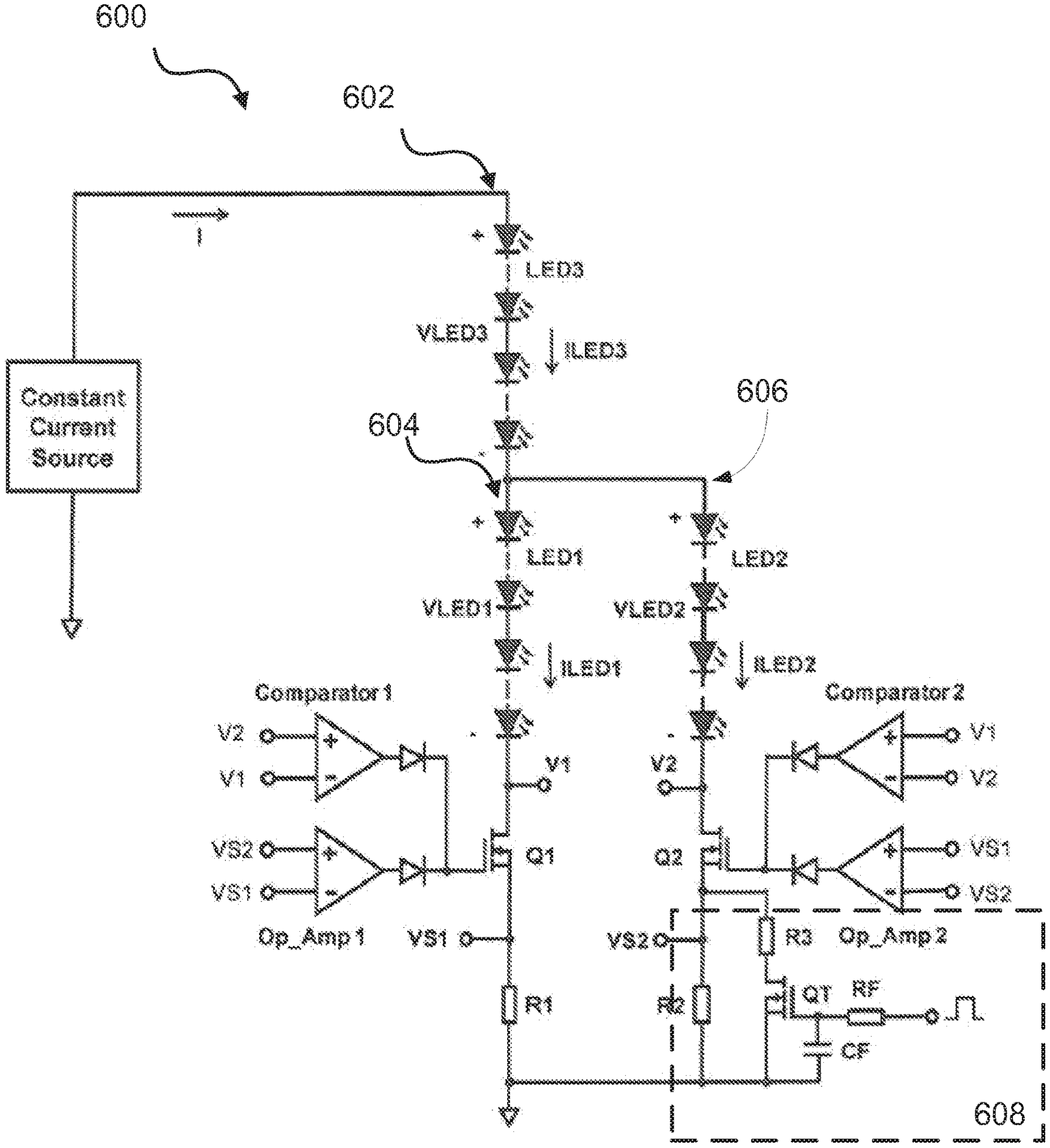
FIG. 6 shows another example system for a current sharing driver for light emitting diodes according to one embodiment.

Turning now to FIG. 6, FIG. 6 shows yet another example system 600 for a current sharing driver for light emitting diodes according to one embodiment. The system 600 operates similarly to system 400 described with regard to FIG. 4. However, system 600 further includes a third string of LEDs, LED3 (identified by reference no. 602), which is connected directly to the current source. In such an embodiment, the current provided to LED3, ILED3, maintains a constant value. However, the two remaining strings LED1 (identified by reference no. 604) and LED2 (identified by reference no. 606) are connected in parallel with each other but in series with LED3. Thus, the sum of the currents to LED1 and LED2 will equal the current supplied to LED3, i.e., ILED3=ILED1+ILED2. Thus, in some embodiments, the LED string LED3 may be substantially brighter than both LED1 and LED2.

In some embodiments, the designer may set the value of resistors R1 and R2 to set a balance between the current through LED strings LED1 and LED2. This will also set the brightness of each of these strings. A designer may set this brightness in order to compensate for color or other factors associated with the LEDs in each string.

Further, in the embodiment shown in FIG. 6, as with circuit 400 described with regard to FIG. 4, a pulse generating circuit, such as a PWM pulse is used to tune the impedance of the control switch QT. The components of this pulse generating circuit is shown within the dashed box identified by reference no. 608. This enables the current and the light intensity of string LED2 to be adjusted. In some embodiments, this variance in intensity may be useful for color mixing. For example, if LED1 is a BSY (blue-shifted-yellow) string and LED2 is a RED color string, the color temperature of the light fixture can be tuned to the desired value, for example, by increasing or decreasing the current flow to each string.

A person of ordinary skill in the art will recognize that the circuit shown in FIG. 6 may be used in combination with another circuit. For example, the current control system shown in FIG. 6 may be used in combination with components described with regard to FIGS. 2-5 and 7-10.

Figure 7:
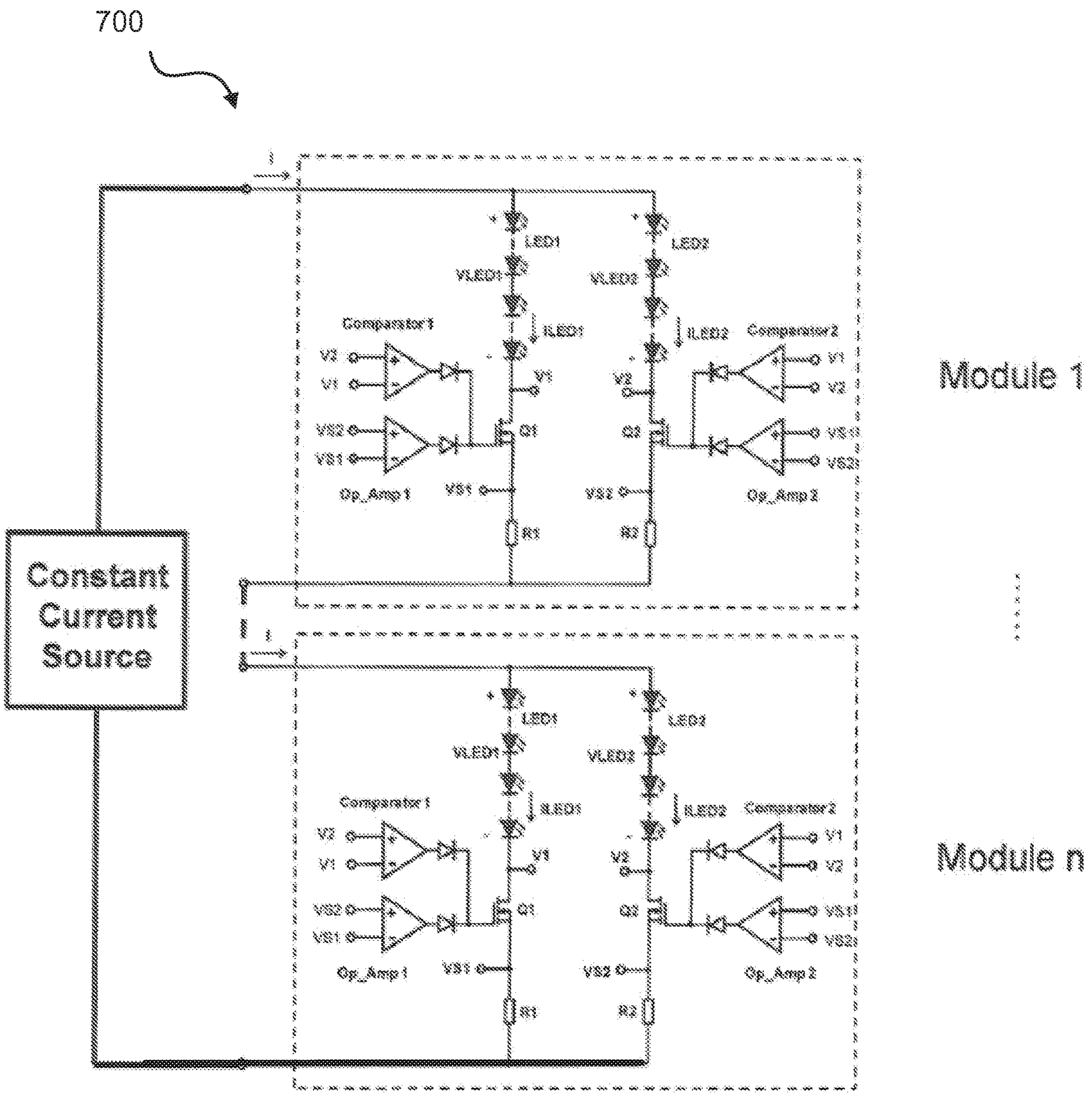
FIG. 7 shows another example system for a current sharing driver for light emitting diodes according to one embodiment

Turning now to FIG. 7, FIG. 7 shows yet another example system 700 for a current sharing driver for light emitting diodes according to one embodiment. As shown in FIG. 7, a plurality of current balancing circuits such as those described above with regard to FIGS. 1-6 are placed in series. In some embodiments, each module may contain two or more LED strings and a current sharing circuit. The embodiment shown in FIG. 7 allows a plurality of modules to be combined to obtain higher overall power and lumen output.

Each module shown in FIG. 7 comprises a current sharing driver circuit of the type described above with regard to FIGS. 2 and 3. As described above, a designer may adjust the value of sensing resistors in order to set the current balance between each string of LEDs in the module. In some embodiments, the designer may select resistors to adjust brightness such that it can create a more pleasing (e.g., warmer) light or to compensate for other factors associated with the each LED, string of LEDs, or module of LEDs.

Further, in some embodiments, other types of current balancing circuits, such as those described throughout this application may be included in a module form. Further, in some embodiments, a plurality of modules such as those shown in FIG. 7 may be grouped into a module, which may then be combined with other similar modules allowing an even larger number of modules to be combined to obtain higher overall power and lumen output.

A person of ordinary skill in the art will recognize that the circuit shown in FIG. 7 may be used in combination with another circuit. For example, the current control system shown in FIG. 7 may be used in combination with components described with regard to FIGS. 2-6 and 8-10.

Figure 8:
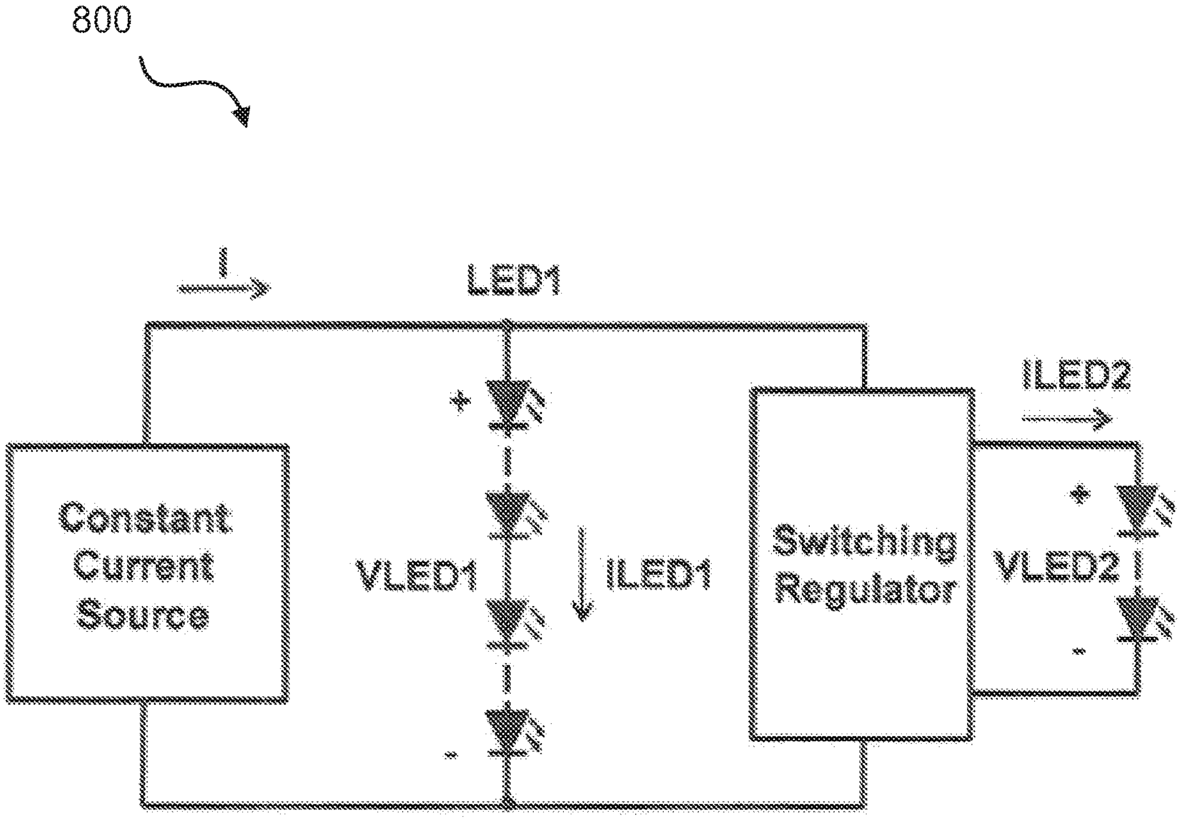
FIG. 8 shows another example system for a current sharing driver for light emitting diodes according to one embodiment.

Turning now to FIG. 8, FIG. 8 shows yet another example system 800 for a current sharing driver for light emitting diodes according to one embodiment. The embodiment shown in FIG. 8 differs from the other embodiments described above in that instead of a current sharing circuit with linear current regulators, a switching regulator is used. In some embodiments, a switching regulator, such as one or more of a boost, buck, or chop regulator, may rapidly switch a series device on and off. For example, as shown in FIG. 8, the switching regulator may rapidly switch the LEDs in LED string LED2 on and off in order to regulate the current flowing through that string.

In the embodiment shown in FIG. 8, the current flowing through the LED string LED2 is regulated by the switching regulator. Further, because the LED string LED1 is in parallel with the switching regulator, the switching regulator also controls the current flowing through LED1. In some embodiments, this design may be used to vary the brightness through each string of LEDs to improve the overall quality of light or compensate for other factors associated with each LED or string of LEDs, as discussed above.

In some embodiments, a benefit of using a switching regulator may be lower power loss. In some embodiments, this can improve the overall efficiency of the circuit, and reduce the amount of heat generated by the power loss. In some embodiments, this advantage may still be present even if the voltage difference between LED1 and LED2 is relatively high.

A person of ordinary skill in the art will recognize that the circuit shown in FIG. 8 may be used in combination with another circuit. For example, the current control system shown in FIG. 8 may be used in combination with components described with regard to FIGS. 2-7 and 9-10.

Figure 9:
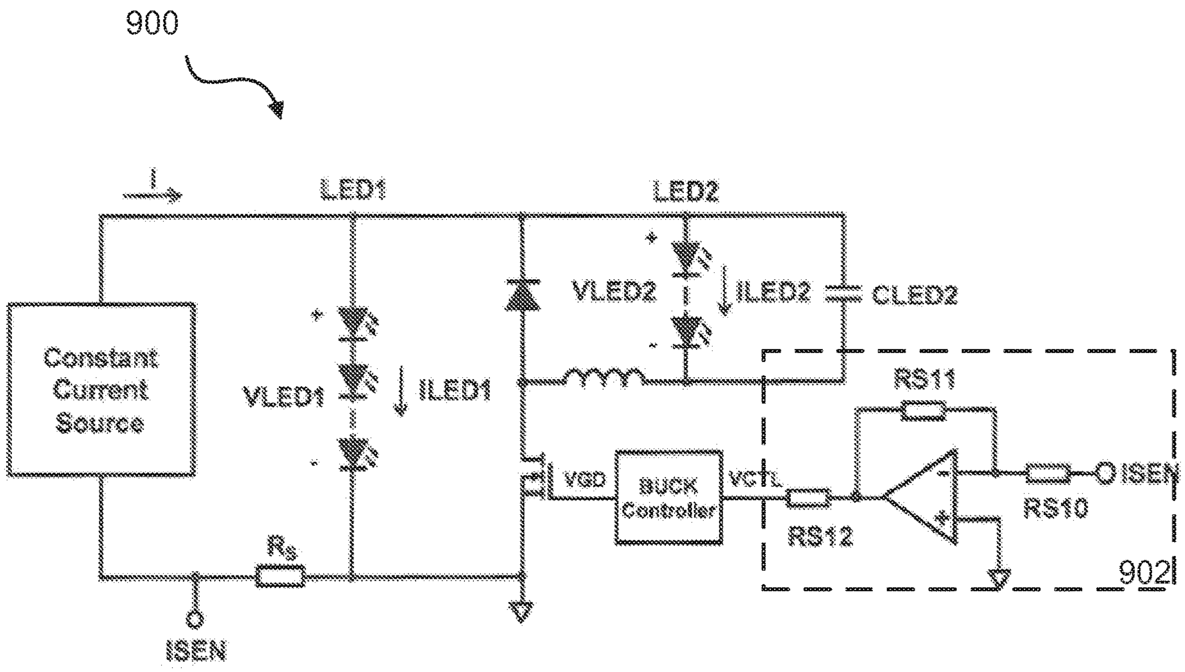
FIG. 9 shows another example system for a current sharing driver for light emitting diodes according to one embodiment.

Turning now to FIG. 9, FIG. 9 shows yet another example system 900 for a current sharing driver for light emitting diodes according to one embodiment. The embodiment shown in FIG. 9, further comprises a buck switching regulator or any other type of switching regulator and dimming control.

In the embodiment shown in FIG. 9, the total current from the constant current source is sensed by resistor RS to generate a sense voltage. This sense voltage is then amplified by an operation amplifier circuit 902 with a gain equal to the value of RS11/RS10. The output of the operational amplifier, i.e., the amplified voltage VCTL is then passed into a switching regulator, shown in this example as a buck controller, which controls the current flowing through a MOSFET configured to control the current through LED2, ILED2. In the embodiment shown in FIG. 9, the higher the constant current I, the higher the control voltage VCTL, and thus the higher LED current ILED2.

In the embodiment shown in FIG. 9, the ratio for the current between each LED string, ILED1/ILED2, is kept constant, even when the current from constant current source I is reduced, e.g., during dimming. In some embodiment, this enables the circuit 900 to maintain the same overall color temperature even when the brightness of each string of LEDs is reduced.

A person of ordinary skill in the art will recognize that the circuit shown in FIG. 9 may be used in combination with another circuit. For example, the current control system shown in FIG. 9 may be used in combination with components described with regard to FIGS. 2-8 and 10.

Figure 10:
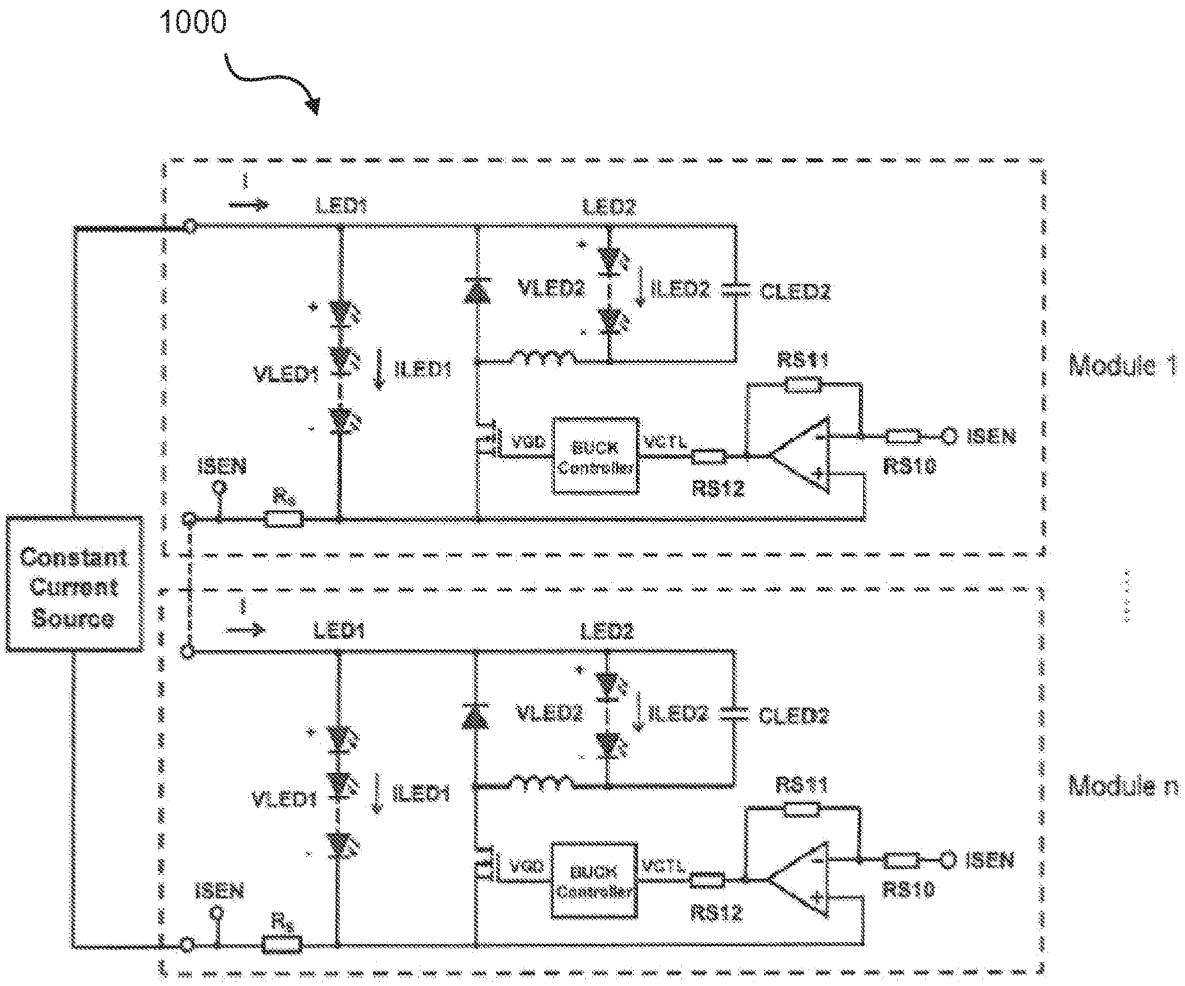
FIG. 10 shows another example system for a current sharing driver for light emitting diodes according to one embodiment.

Turning now to FIG. 10, FIG. 10 shows yet another example system 1000 for a current sharing driver for light emitting diodes according to one embodiment. The embodiment shown in FIG. 10 comprises a modular system comprising a plurality of current sharing drivers for light emitting diode circuits similar to those described above with regard to FIG. 9. This modular approach allows a plurality of modules to be combined to obtain higher overall power and lumen output. In some embodiments, a modular approach allows the total voltage across each module to be very low. Further, in some embodiments a modular approach allows for a high switching frequency, e.g., 500 kHz, to shrink the size of the switching regulators.

A person of ordinary skill in the art will recognize that the circuit shown in FIG. 10 may be used in combination with another circuit. For example, the current control system shown in FIG. 10 may be used in combination with components described with regard to FIGS. 2-9.

Advantages of Systems and Methods for a Current Sharing Driver for Light Emitting Diodes There are numerous advantages of the current sharing circuit of present disclosure. For example, some embodiments provide more flexibility when choosing LED strings. For example, embodiments of the present disclosure enable the designer to select different LEDs with different characteristics. In some embodiments, this enables the designer to include different numbers of LEDs in each string.

Further, embodiments of the present disclosure enable additional LED strings to be placed in the same package. Because these LED strings can be placed in parallel, the total voltage drop of the circuit can be reduced. This can allow the designer to build an LED circuit with a greater number of LEDs, and therefore a higher overall light output. Furthermore, as discussed above, an even larger number of LEDs may be incorporated by using a modular approach with a plurality of current sharing drivers of the types discussed above.

Embodiments described above also allow the designer to adjust brightness to create a more pleasing (e.g., warmer light) or to compensate for other factors associated with the each LED, string of LEDs, or module of LEDs. For example, in some embodiments the resistors may be selected to compensate for different light output characteristics, e.g., dominant wavelength ("DW"), peak wavelength ("PW"), uniform light output, total luminous flux ("TLF"), and light color rendering index ("CRT"). In some embodiments, this enables a broader range of LEDs to be used, reducing production cost, because marginal LEDs that would previously have been discarded may be used. Further, the current level can be set to maximize the life of each LED or string of LEDs.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A current sharing driver comprising:

a first current control device configured to control current to a first string of LEDs connected in parallel with a second string of LEDs;

a first voltage measurement device coupled to the first string of LEDs and the second string of LEDs and configured to control the first current control device in response to a comparison between a first voltage measurement of the first string of LEDs and a second voltage measurement of the second string of LEDs, wherein an output of the first voltage measurement device is directly coupled to the first current control device;

a second current control device configured to control current to the second string of LEDs;

a second voltage measurement device coupled to the first string of LEDs and the second string of LEDs and configured to control the second current control device in response to a comparison of measurements between the second voltage measurement and the first voltage measurement, wherein an output of the second voltage measurement device is directly coupled to the second current control device; and a third string of LEDs connected in series between a constant current source and the first and second strings of LEDs, wherein the third string of LEDs is configured to maintain a constant current value from the constant current source that is higher than a current value of the first string of LEDs and higher than a current value of the second string of LEDs.

2. The current sharing driver of claim 1, wherein each of the first and second current control devices comprise one or more of: a Bipolar Junction Transistor (BJT); a MOSFET; a junction gate field-effect transistor (JFET); or an insulated gate field effect transistor (IGFET).

3. The current sharing driver of claim 1, wherein each of the first and second voltage measurement devices comprise: a comparator and an op-amp.

4. A current sharing driver comprising:
- a plurality of strings of LEDs coupled in parallel;
- a separate current control device coupled in series with each one of the plurality of strings of LEDs, each current control device configured to control the current to one of the plurality of strings of LEDs;
- a separate voltage measurement device for each one of the plurality of strings of LEDs, each voltage measurement device coupled to each of the plurality of strings of LEDs and an output of each voltage measurement device is directly coupled to a different single one of the current control devices and configured to control the single one of the current control devices in response to relative voltage measurements from each of the plurality of strings of LEDs; and
- an additional string of LEDs coupled in series with a current source, wherein the plurality of strings of LEDs are connected in series to the additional string of LEDs such that the additional string of LEDs is configured to maintain a constant current value that is higher than a current value for each string of LEDs of the plurality of strings of LEDs.

5. The current sharing driver of claim 4, further comprising:
- a second current control device configured to control current to a second string of LEDs; and
- a second voltage measurement device coupled to the plurality of strings of LEDs and configured to control the second current control device in response to measurements from each of the plurality of strings of LEDs.

6. The current sharing driver of claim 5, wherein each current control device comprises one or more of: a Bipolar Junction Transistor (BJT); a MOSFET; a junction gate field-effect transistor (JFET); or an insulated gate field effect transistor (IGFET).

7. The current sharing driver of claim 5, wherein each voltage measurement device comprises: a comparator and an op-amp.

8. A current sharing driver comprising:
- a first string of LEDs;
- a second string of LEDs connected in parallel with the first string of LEDs;
- a third string of LEDs connected in series between a constant current source and the first and second strings of LEDs such that the third string of LEDs is configured to maintain a constant current value from the constant current source;
- a first current control device configured to control current to the first string of LEDs based on relative voltages as provided by current sensing resistances of the first string of LEDs and the second string of LEDs;
- a first voltage measurement device coupled to the first string of LEDs and the second string of LEDs and configured to control the first current control device in response to a comparison between a first voltage measurement of the first string of LEDs and a second voltage measurement of the second string of LEDs, wherein an output of the first voltage measurement device is directly coupled to the first current control device;
- a second current control device configured to control current to the second string of LEDs based on relative voltages as provided by current sensing resistances of the first string of LEDs and the second string of LEDs;
- a second voltage measurement device coupled to the first string of LEDs and the second string of LEDs and configured to control the second current control device in response to a comparison between the first voltage measurement of the first string of LEDs and the second voltage measurement of the second string of LEDs, wherein an output of the second voltage measurement device is directly coupled to the second current control device; and
- a tuning circuit for adjusting the current to the second string of LEDs by changing the current sensing resistance of the second string of LEDs.

9. The current sharing driver of claim 8, wherein the tuning circuit adjusts the current to the second string of LEDs to control a color temperature of a total light output of the first string of LEDs and the second string of LEDs.

10. The current sharing driver of claim 8 wherein the first current control device comprises a switching regulator configured to control the current flowing through the first string of LEDs.

11. The current sharing driver of claim 10, wherein the switching regulator is configured to maintain a ratio of the current between the first string of LEDs and the current between the second string of LEDs at a known value.

12. The current sharing driver of claim 10, wherein the switching regulator comprises:
- a sensing resistor configured to generate a sense voltage based on the total current flowing to the first and second string of LEDs;
- an operational amplifier configured to amplify the sense voltage; and
- a switching device configured to control the current flowing through the second string of LEDs.

13. The current sharing driver of claim 8 wherein the first current control device comprises a first switching regulator configured to control the current flowing through the first string of LEDs.

14. The current sharing driver of claim 13 wherein a current source delivers a total current to the first string of LEDs and to the second string of LEDs, wherein the first switching regulator controls the current flowing through the first string of LEDs as a ratio of the total current.

15. The current sharing driver of claim 13 wherein the first switching regulator controls the current flowing through the first string of LEDs relative to the current flowing through the second string of LEDs.

16. The current sharing driver of claim 10, wherein the switching regulator controls the current to the first string of LEDs to control a color temperature of a total light output of the first string of LEDs and the second string of LEDs.

* * * * *